July 21, 1970 L. BARTOLONI 3,521,418

PRE-FINISHED DECORATIVE RIGID PANEL

Filed Sept. 25, 1967

INVENTOR
LAWRENCE BARTOLONI

BY *Whittemore, Hulbert & Belknap*

ATTORNEYS

United States Patent Office 3,521,418
Patented July 21, 1970

3,521,418
PRE-FINISHED DECORATIVE RIGID PANEL
Lawrence Bartoloni, Detroit, Mich., assignor to Ceramic Tile Walls, Inc., Detroit, Mich., a corporation of Michigan
Filed Sept. 25, 1967, Ser. No. 670,193
Int. Cl. E04f *13/16, 13/18, 15/12*
U.S. Cl. 52—318                               2 Claims

ABSTRACT OF THE DISCLOSURE

The panel is adapted to be used on floors or walls of a building. The panel includes a backing support made from fibrous material having a texture sufficiently loose to be impregnated by a plastic resin. A plurality of tile elements of rigid material, defining a decorative facing, are arranged in side by side relationship on the backing support to form a rectangular block configuration. A plastic resin interposed between the backing support and facing impregnates the backing support throughout its entire extent and adhesively secures the facing to the backing support and bonds together adjacent tile elements.

---

The method for making the panel includes the following steps: (a) placing a rectangular open frame on a flat support surface; (b) applying a relatively thin layer of plastic resin to the support surface within the confines of the frame; (c) immersing a backing support made from a fibrous material in the resin to impregnate same throughout its entire extent; (d) applying a second layer of plastic resin to the top surface of the impregnated backing support; (e) placing individual facing elements of rigid material on the top surface of the backing support and pressing same against the backing support to cause any excess resin to extrude into the gaps between the individual elements; (f) permitting the resin to harden; (g) and finally removing the frame from the completed panel.

BRIEF SUMMARY OF THE INVENTION

It is an object of the present invention to provide a prefinished decorative rigid panel which eliminates substantially all of the principal objections inherent in panels of similar purposes heretofore known in the art.

Another object of the present invention is to provide a panel of the aforementioned type which is manufactured with a pre-finished face and a rigid resin impregnated fibrous backing support permitting ready installation of the panel in the field.

Still another object of the present invention is to provide a pre-finished decorative rigid panel of the aforementioned type adapted to be secured to a surface of a room in a building structure by appropriate fastening means comprising a backing support made from fibrous material having a texture sufficiently loose to be impregnated by a plastic resin, a decorative facing made from rigid material and located on one side of the backing support, and a plastic resin completely impregnating the backing support and adhesively securing the facing to the backing support, said resin protecting the backing support from moisture.

A further object of the present invention is to provide a pre-finished decorative rigid panel of the aforementioned type wherein the rigid material comprises a plurality of rectangular tiles arranged in side by side relationship on the backing support to form a rectangular block configuration, the opposing edges of adjacent tiles being spaced apart to form gaps which are filled with and closed by the resin.

A still further object of the present invention is to provide a pre-finished decorative rigid panel of the aforementioned type wherein the one side of the backing support is provided with a plurality of untiled areas, each area being of a size corresponding to the size of a tile, each of the areas having a hole therein to permit the mounting of the panel on a surface, said areas being adapted to be covered by tiles after the erection of the panel.

Another object of the present invention is to provide a method of making a panel comprising the steps of placing a generally rectangular frame on a flat support surface, applying a thin layer of plastic resin to the surface, immersing a backing support made from a fibrous material in the resin to impregnate same, applying a second layer of resin to the impregnated backing support, placing individual facing elements on the backing support and pressing same against such support to cause any excess resin to extrude into the gaps between the individual elements, permitting the resin to cure and then removing the frame.

Still another object of the present invention is to provide a panel of the aforementioned type which is simple in construction, and inexpensive of design, manufacture and installation in relation to prior art devices of like function.

Further objects and advantages of the present invention will be apparent from the following description, reference being had to the accompanying drawing wherein a preferred form of the present invention is clearly shown.

DETAILED DESCRIPTION

Figure 1:
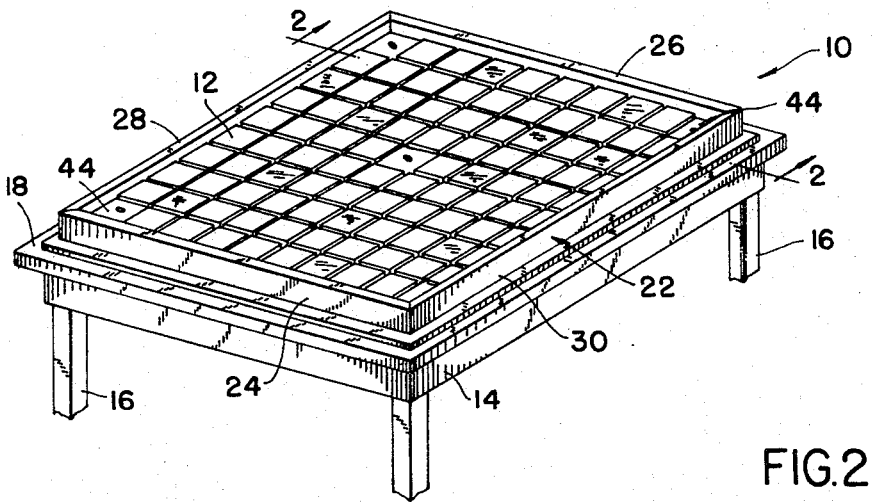
FIG. 1 is a perspective view of the apparatus for making the pre-finished decorative rigid panel of the present invention.

In the construction industry the architect or builder prepares the specifications of the desired design of tile wall or floor. The specifications, as an example, are submitted to the tile manufacturer who selects the tiles of the proper color, size and shape. Thereafter the required tiles are shipped to the job where the workman imbeds or places the individual tiles in a cement backing and arranges them according to the predetermined pattern or design. It has become increasingly more difficult and expensive to lay or place the individual tiles and to produce a finished wall surface that is flat and smooth and laid according to the original design. The labor cost of laying individual tiles is increasing.

In the present invention the tile elements are assembled in panels of requisite pattern at the factory. The tiles of each panel are assembled upon a resin impregnated fibrous backing support as a monolithic slab. Such slab or panel can be shipped to the place of installation in the same manner as a slate, marble, or other panel.

The drawing illustrates an apparatus 10 for making a pre-finished decorative rigid panel 12 which may serve as either a floor panel or as a wall panel for a building structure. The apparatus 10 includes a support table 14 having a plurality of legs 16 and a generally flat horizontal support surface 18 of rectangular configuration.

In the manufacture of the pre-finished panel 12 a relatively thin sheet 20, made from plastic or other suitable material, is placed on the flat support surface 18. The sheet 20 is inert to the plastic resin which is used during the manufacture of the panel 12. The sheet 20 is flexible and has a thickness of approximately $\frac{1}{64}$". The apparatus 10 further includes a generally rectangular open frame 22 including a pair of parallel frame members 24 and 26 which are connected at their ends by a pair of parallel frame elements 28 and 30, as an example, like a window frame. The frame 22, as an example, is made from wood and the inside dimensions thereof are substantially equal to the outside dimensions of the panel 12.

Figure 2:
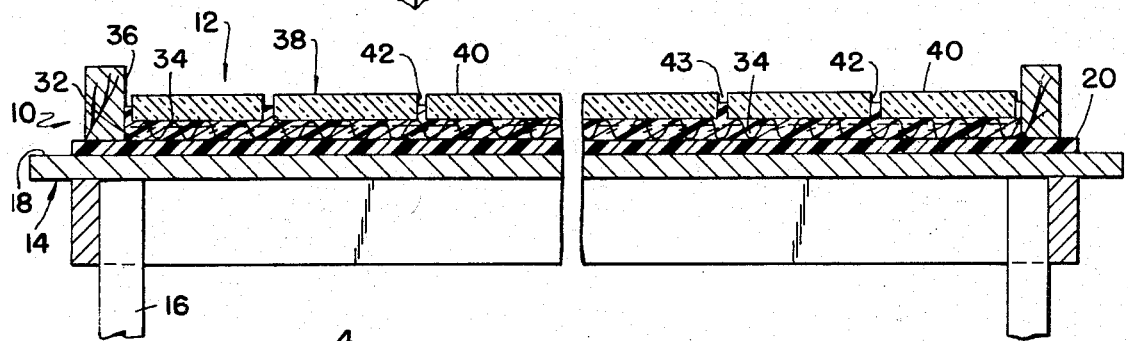
FIG. 2 is a sectional view taken on the line 2—2 of FIG. 1, with parts broken away.

The frame 22, which may be of any size and configuration, is placed on the sheet 20 as illustrated in FIGS. 1 and 2. A thin layer 32 of a plastic resin in a liquid state, as an example, a composition consisting of an epoxy and a hardener, is uniformly applied to the entire support area within the confines of the frame 22. The resin 32 does not react with the plastic sheet 20. The layer 32 may have a uniform thickness of approximately $\frac{1}{8}$". A backing support 34, made from a fibrous material having a sufficiently loose texture, is immersed in the plastic resin 32 and is completely impregnated or saturated thereby throughout its entire extent. The fibrous backing support 34 in its original condition is approximately $\frac{1}{4}$" thick and has a length and width substantially equal to the inside dimensions of the frame 22. After the backing support 34 is impregnated with the plastic resin, the thickness of such support is reduced to approximately $\frac{1}{8}$". The backing support 34 may be made from felt, burlap, fiber glass cloth or other fibrous or porous absorbing material.

A second relatively thin layer 36 of plastic resin, as an example, having a uniform thickness of $\frac{1}{16}$", is spread on the resin impregnated backing support 34 to increase the bonding capabilities of the backing support 34 to the decorative pre-finished facing 38. The pre-finished facing 38 comprises a plurality of individual facing elements 40 of relatively rigid or hard material. Such facing elements 40, as an example, may take the form of ceramic tile, ceramic mosaic, marble chips, and various types of gravel or stone products.

FIGS. 1–4 illustrate individual facing elements 40 in the form of ceramic tile elements. The tile elements 40, as an example, are approximately $4\frac{1}{4}$" square. The back sides of the tile elements 40 are placed in the resin impregnated backing support 34. The tile elements 40 are arranged in longitudinally and transversely extending rows in a side by side relationship to form a generally rectangular pattern as shown in FIG. 1. Minute gaps 42 are in certain instances provided between adjacent tile elements 40. After a predetermined number of tile elements 40 have been placed in the frame 22 on the resin impregnated backing support 34, the elements 40 are pressed towards the backing support 34 whereby any excess resin 36 is urged into the gaps 42 between adjacent tile elements 40 to close the inner ends thereof. The outer ends 43 of the gaps 42 are not closed by the excess resin. Thus the resin provides a means for caulking the gaps 42 between the adjacent tile elements 40 and for providing a bond between the adjacent tile elements 40. This procedure is repeated until the required number of tile elements 40 are arranged in the frame 22 according to the selected pattern of color, size and shape.

In order to mount the pre-finished panel 12 in the field, a predetermined number of untiled areas 44 are provided on the backing support 34. In other words, certain tile elements are not laid or placed in the panel 12 during the manufacture thereof. After the panel 12 has hardened, mounting holes 46 are provided in the areas 44. In certain instances, a reinforcing washer 48 may be inserted in the plastic resin of each area 44 and imbedded therein as shown in FIGS. 3 and 4.

After the tile elements 40 have been inserted in the frame 22, the plastic resin is permitted to cure either in the atmosphere or by the use of ovens. It takes approximately four to eight hours to cure each panel. The exact time required depends on the curing temperature. Once the plastic resin has hardened the frame 22 is removed. The holes 46 are placed in the untiled areas 44 after the resin has hardened. After the panel has cured, the $\frac{1}{16}$" outer surface cracks 43 at the outer ends of gaps 42, as shown in FIG. 2, are closed or filled with a conventional cement grout or filler, not shown, which hardens in approximately ten minutes. Thereafter, the panel 12 is ready to be installed at the job site. Panels 12 are mounted in the field to cover a wall surface or to provide a floor.

Figure 3:
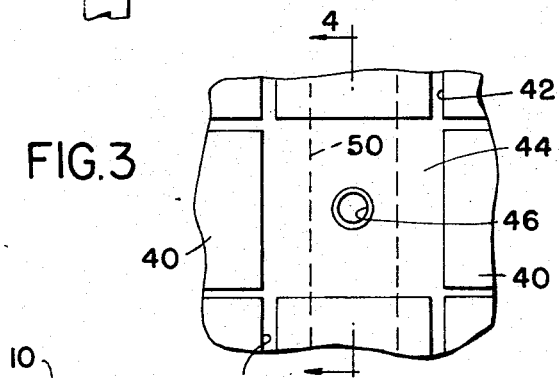
FIG. 3 is a front elevational view of a portion of the pre-finished panel, illustrating one of the untiled areas for mounting the panel on a support.
Figure 4:
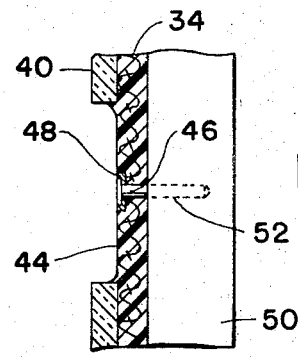
FIG. 4 is a fragmentary sectional view of the installed panel, taken on the line 4—4 of FIG. 3.

FIGS. 3 and 4 illustrate a fragmentary view of a panel 12 as installed. The panel 12 is mounted to wall studs 50 of a building structure by means of nails or other fastening devices 52. After the panel 12 is mounted, the untiled areas are then provided with an adhesive or resin. Finally, a tile element 40 is inserted into each area 44 and is secured to the backing support 34 and the adjacent tile elements 40 by the plastic resin.

Figure 5:
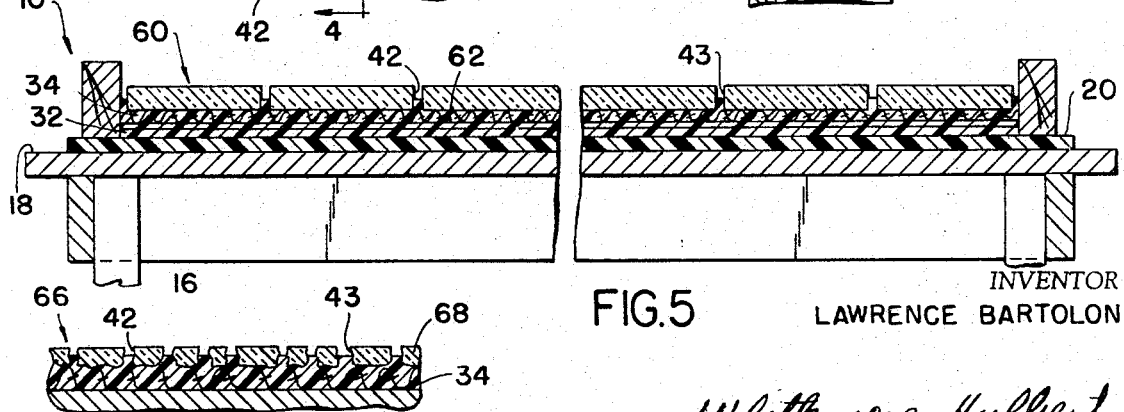
FIG. 5 is a sectional view, similar to FIG. 2, with parts broken away and illustrating a modified form of the present invention.

FIG. 5 illustrates a modified pre-finished decorative rigid panel 60. The panel 60 is similar to panel 12 and is made with the apparatus 10 as previously described. After the initial layer 32 of plastic resin is applied to the top of the plastic sheet 20 a plurality of relatively thin elongated reinforcing strips or rods 62 made from fiber glass are immersed in the resin 32 to provide reinforcement for the backing support 34 and the resulting finished panel 60. The reinforcing elements or rods 62, as shown in FIG. 5, may be arranged in longitudinally aligned rows or immersed in the resin in a random manner.

Figure 6:
FIG. 6 is a fragmentary sectional view of still another modified pre-finished panel.

FIG. 6 illustrates a modified panel 66 which is made with the apparatus 10 as previously described. The panel 66 includes the resin impregnated backing support 34 provided with a front decorative facing comprising a plurality of relatively small chips or gravel products 68 made from suitable rigid materials. As an example, marble chips or other stone or gravel products may be utilized. The gaps or minute spaces 42 between adjacent elements 68 are partially filled with the epoxy resin. The outer ends 43 of the gaps 42 are grouted with conventional cement grout after the panel 66 is cured as was explained in connection with the method of making panel 12.

The resulting pre-finished panels are waterproof. The resin impregnated backing support 34 prevents moisture from getting in between the panel and the wall surface upon which the panel is mounted. The resulting panels are rigid and can withstand various high and low temperatures. The present invention insures accuracy in the reproduction of the required pattern as to size, color and shape.

The plastic resin utilized consists of an epoxy resin and a hardener. Excellent results have been obtained by utilizing a suitable mixture of #37–605 hardener and #37–128 epoxy resin, both manufactured by Reichold Chemicals, Inc. of White Plains, N.Y. 10602. The uncured plastic resin has a low viscosity to permit easy application of same as described previously. The plastic resin, when cured, is very hard and provides a permanent bond between the facing elements and the fibrous backing support. The cured resin backing support of the panel has a hardness of between 80–90 Shore. The plastic resin encloses the entire backing support and thereby makes the entire panel moisture or waterproof.

The drawing and the foregoing specification constitute a description of the improved pre-finished decoative rigid panel in such full, clear, concise and exact terms as to enable any person skilled in the art to practice the invention, the scope of which is indicated by the appended claims.

What I claim as my invention is:

1. A precast decorative moisture-proof panel construction of generally rectangular configuration comprising a backing support made from a fibrous material which has a thickness of approximately ¼ inch, a decorative facing located on one side of said backing support and secured thereto throughout its entire extent by a curable plastic resin consisting of an epoxy resin and a hardener, said backing support having a texture sufficiently loose to be impregnated by said plastic resin which reduces the thickness of said backing support to approximately ⅛ inch, said decorative facing consisting of a plurality of square shape tile elements of the same size which are located in perpendicularly arranged rows, the tile elements in each row being arranged in side by side relationship and spaced slightly apart from adjacent tile elements to form relatively narrow gaps, said plastic resin when said tile elements are placed on said resin impregnated backing support extending outward from between said spaced edges of adjacent tile elements into said narrow gaps tending to close same, the cured plastic resin having a hardness of between 80–90 Shore and bonding said tile elements and backing support together into a unitary moisture-proof structure, and a plurality of relatively thin elongated reinforcing rods located on the other side of said backing support and completely enveloped by said plastic resin, said reinforcing rods providing additional structural reinforcement for said panel construction.

2. The precast decorative moisture-proof panel construction of claim 1 wherein said reinforcing rods are made from fiber glass.

References Cited

UNITED STATES PATENTS

| | | | |
|---|---|---|---|
| 1,910,810 | 5/1933 | Nash | 52—388 |
| 1,968,189 | 7/1934 | Bartels | 52—389 |
| 2,122,696 | 7/1938 | Poston | 52—389 |
| 2,130,911 | 9/1938 | Teunon | 52—315 |
| 2,266,510 | 12/1941 | Pottinger | 52—389 |
| 2,308,650 | 1/1943 | Desagnat | 52—388 |
| 2,931,751 | 4/1960 | Du Fresne | 52—388 |
| 3,125,831 | 3/1964 | Marsch et al. | 52—384 |
| 3,131,514 | 5/1964 | Siek | 52—315 |
| 3,362,119 | 1/1968 | Murphy | 52—389 |

FOREIGN PATENTS 291,256  5/1928  Great Britain.

HENRY C. SUTHERLAND, Primary Examiner

J. L. RIDGILL, Jr., Assistant Examiner

U.S. Cl. X.R.

52—315, 389; 156—297; 161—36, 165; 264—255